(12) United States Patent
Hirsch et al.

(10) Patent No.: US 9,624,417 B2
(45) Date of Patent: Apr. 18, 2017

(54) LOW BINDER, WEAR RESISTANT HARD METAL

(71) Applicant: SANDVIK INTELLECTUAL PROPERTY AB, Sandviken (SE)

(72) Inventors: Alexander Hirsch, Royal Leamington Spa (GB); Annabelle Meilland, Grenoble (FR); Stefan Ederyd, Saltsjo-boo (SE); Marion Fumaroli, Kourou (GF); Ylva Gerharson, Leamington Spa (GB)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/434,156

(22) PCT Filed: Oct. 9, 2013

(86) PCT No.: PCT/IB2013/002907
§ 371 (c)(1),
(2) Date: Apr. 8, 2015

(87) PCT Pub. No.: WO2014/057358
PCT Pub. Date: Apr. 17, 2014

(65) Prior Publication Data
US 2015/0259590 A1    Sep. 17, 2015

Related U.S. Application Data
(60) Provisional application No. 61/711,705, filed on Oct. 9, 2012.

(51) Int. Cl.
| | |
|---|---|
| *B22F 3/15* | (2006.01) |
| *C09K 5/14* | (2006.01) |
| *C04B 35/56* | (2006.01) |
| *C04B 35/645* | (2006.01) |
| *C22C 29/08* | (2006.01) |
| *C22C 1/05* | (2006.01) |

(52) U.S. Cl.
CPC .................. *C09K 5/14* (2013.01); *B22F 3/15* (2013.01); *C04B 35/5626* (2013.01); *C04B 35/645* (2013.01); *C04B 35/6455* (2013.01); *C22C 1/051* (2013.01); *C22C 29/08* (2013.01); *B22F 2998/10* (2013.01); *C04B 2235/3839* (2013.01); *C04B 2235/3843* (2013.01); *C04B 2235/404* (2013.01); *C04B 2235/405* (2013.01); *C04B 2235/422* (2013.01); *C04B 2235/5436* (2013.01); *C04B 2235/5445* (2013.01); *C04B 2235/6581* (2013.01); *C04B 2235/785* (2013.01); *C04B 2235/96* (2013.01)

(58) Field of Classification Search
None
See application file for complete search history.

(56) References Cited

U.S. PATENT DOCUMENTS

| | | | |
|---|---|---|---|
| 2,091,017 A | 8/1937 | Scwarzkkopf | |
| 4,049,380 A | 9/1977 | Yih et al. | |
| 4,574,011 A | 3/1986 | Bonjour et al. | |
| 4,945,073 A | 7/1990 | Dubensky et al. | |
| 5,215,945 A * | 6/1993 | Dubensky | C04B 35/5607 423/138 |
| 5,421,852 A | 6/1995 | Maruyama et al. | |
| 5,482,670 A | 1/1996 | Hong | |
| 5,778,301 A * | 7/1998 | Hong | C22C 1/051 419/15 |
| 6,521,353 B1 | 2/2003 | Majagi et al. | |
| 2003/0134135 A1 | 7/2003 | Noda | |
| 2011/0195834 A1 | 8/2011 | Banerjee et al. | |

FOREIGN PATENT DOCUMENTS

| | | |
|---|---|---|
| CN | 1172168 A | 2/1998 |
| CN | 1431330 A | 7/2003 |
| CN | 101205584 A | 6/2008 |
| DE | 764510 C | 7/1953 |
| EP | 0214679 A1 | 3/1987 |
| EP | 559901 B1 | 4/1996 |
| GB | 1350634 A | 4/1974 |
| JP | H06228701 A | 8/1994 |
| WO | 86/01196 A1 | 2/1986 |
| WO | 2007022514 A2 | 2/2007 |

OTHER PUBLICATIONS

Wen-Fung Wang: "Effect of Carbide and Nitride Addition on the Strength of Sintered TiC-Mo2C-Ni Carbides", Journal of Materials Engineering and Performance, ASM International, Materials Park,OH, US. vol. 5, No. 11, Oct. 1, 2002 (pp. 516-518.

* cited by examiner

*Primary Examiner* — Jessee Roe
*Assistant Examiner* — Ngoclan T Mai
(74) *Attorney, Agent, or Firm* — Corinne R. Gorski (57) ABSTRACT

The invention is a low binder, wear resistant material including, in weight percent of raw materials, from 15% to 20% of molybdenum carbide added in either elemental or compound form, an alloy of 0.9% to 3% cobalt, nickel or a combination of cobalt and nickel, of 0 to 0.1% of chromium carbide, optionally also titanium carbide or titanium tungsten carbide and the balance of tungsten carbide.

6 Claims, 14 Drawing Sheets

LOW BINDER, WEAR RESISTANT HARD METAL

RELATED APPLICATION DATA

This application is a §371 National Stage Application of PCT International Application No. PCT/IB2013/002907 filed Oct. 9, 2013 claiming priority of U.S. Provisional Application No. 61/711,705, filed Oct. 9, 2012.

TECHNICAL FIELD AND INDUSTRIAL APPLICABILITY

The present disclosure relates to a WC-based material with low amount of binder but with a high amount of $Mo_2C$, which presents a high hardness, and low friction coefficient.

SUMMARY

In one embodiment, a low binder, wear resistant material includes, in weight percent, from about 15 to of about 20% of molybdenum carbide, an alloy of about 0.9 to of about 3% of cobalt, nickel or a combination of cobalt and nickel, about 0 to of about 0.1% of chromium carbide; and the balance of tungsten carbide. This new material has a high wear and corrosion resistance.

In another embodiment, a low binder, wear resistant material includes 20% molybdenum carbide and 1.8% cobalt.

In yet another embodiment, a low binder, wear resistant material includes 0.1% of chromium carbide.

These and other objects, features, aspects, and advantages of the present invention will become more apparent from the following detailed description of the preferred embodiment relative to the accompanied drawings, in which:

DETAILED DESCRIPTION

Binderless tungsten carbide is defined herein as a tungsten carbide without any metallic phase, such as cobalt, iron or nickel. Due to the absence of any metallic phase, it shows excellent high resistance to oxidation and corrosion, as well as high hardness and high thermal conductivity. It also can withstand much higher temperature than conventional cemented carbide. However, due to the absence of any low melting phase, the sintering of dense binderless tungsten carbide is difficult. Tungsten carbide with low metallic phase can be used to make pump equipment, tools for drilling for composite material, wire drawing dies, wear pads, seal rings and numerous other applications that utilize hard materials.

Thus, an object of the present invention is to provide a composition that offers a good compromise between hardness (linked to porosity), fracture toughness, wear resistance and pressing pressure.

An embodiment of the invention is a low binder, wear resistant material including, in weight percent of raw materials, from about 15% to about 20% of molybdenum carbide added in either elemental or compound form, an alloy of about 0.9% to about 3% cobalt, nickel or a combination of cobalt and nickel, of about 0 to about 0.1% of chromium carbide and the balance of tungsten carbide. Optionally, the low binder, wear resistant material may include materials such as titanium carbide and/or titanium tungsten carbide.

Another embodiment of the invention is a low binder, wear resistant material including, in weight percent of raw materials, about 20% of molybdenum added in either elemental or compound form, an alloy of about 1.8% cobalt, about 0 to about 0.1% of chromium carbide and the balance of tungsten carbide. Optionally, the low binder, wear resistant material may include materials such as titanium carbide and/or titanium tungsten carbide, Another embodiment of the invention is a low binder, wear resistant material including, in weight percent of raw materials, about 20% of molybdenum added in either elemental or compound form, an alloy of about 1.8% nickel, about 0 to about 0.1% of chromium carbide and the balance of tungsten carbide. Optionally, the low binder, wear resistant material may include materials such as titanium carbide and/or titanium tungsten carbide.

Another embodiment of the invention is a low binder, wear resistant material including, in weight percent of raw materials, about 20% of molybdenum added in either elemental or compound form, an alloy of about 1.8% nickel, about 0.1% of chromium carbide and the balance of tungsten carbide. Optionally, the low binder, wear resistant material may include materials such as titanium carbide, and/or titanium tungsten carbide.

Another embodiment includes a method of making a low binder, wear resistant material including the steps of providing from about 15 to of about 20% of molybdenum carbide added in either elemental or compound form, providing an alloy of about 0.9 to of about 3% of cobalt, nickel or a combination of cobalt and nickel, providing about 0 to of about 0.1% of chromium carbide, providing the balance of tungsten carbide to form a powder blend, milling the powder blend, drying the powder blend, sieving the powder blend; pressing the powder blend and sintering the powder blend at a temperature of from about 1450° C. under a pressure of about 50 bar under in an argon atmosphere.

Another embodiment of the method described above includes the additional step of providing titanium carbide.

Another embodiment of the method described above includes the additional step of providing titanium tungsten carbide.

Another embodiment of the method described above includes the additional step of providing about 20% molybdenum and about 1.8% cobalt.

Another embodiment of the method described above includes the additional step of providing about 20% molybdenum and about 1.8% nickel.

Another embodiment of the method described above includes the additional step of providing about 0.1% chromium carbide.

Wear resistance grades with low friction and good thermal conductivity are used for round tools and seal ring application areas. According to an embodiment, a composition for the $Mo_2C$ variant is shown in Table 1.

TABLE 1

| | $Mo_2C$ variant |
|---|---|
| WC008 | 84 |
| $Mo_2C$ | 15 |
| Co | 0.9 |
| PEG3400 | 2 |

Figure 1:
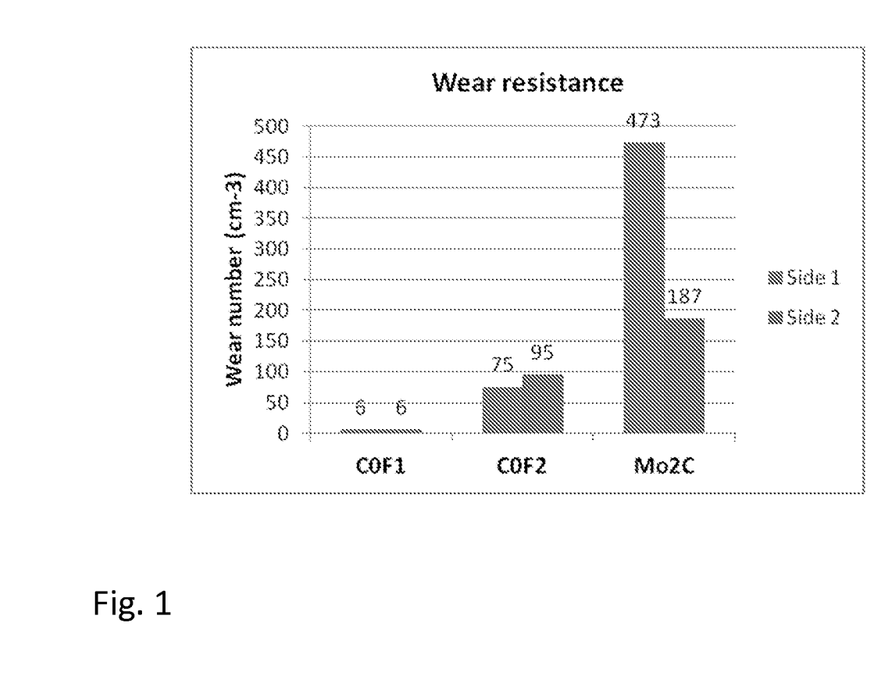
FIG. 1 is a graph of the wear resistance of two binderless variants tested.
Figure 2A:
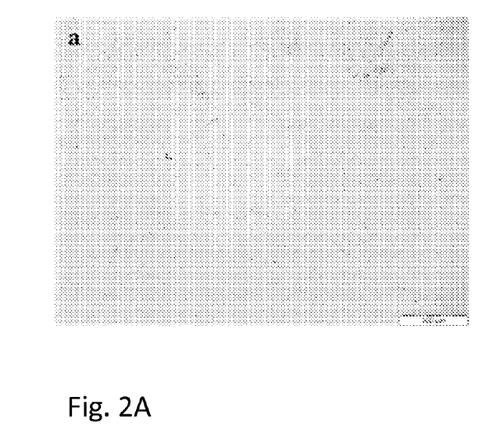
FIG. 2A illustrates the porosity of sample 15/0.9 of Table 2.
Figure 2B:
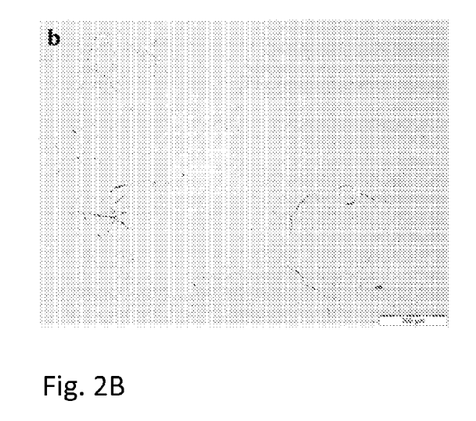
FIG. 2B illustrates the porosity of sample 15/1.8 of Table 2.
Figure 2C:
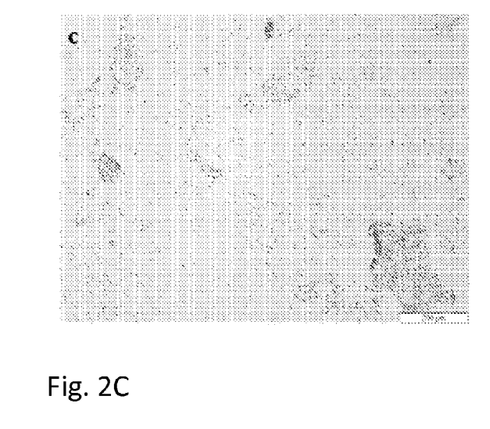
FIG. 2C illustrates the porosity of sample 20/0.9 of Table 2.
Figure 2D:
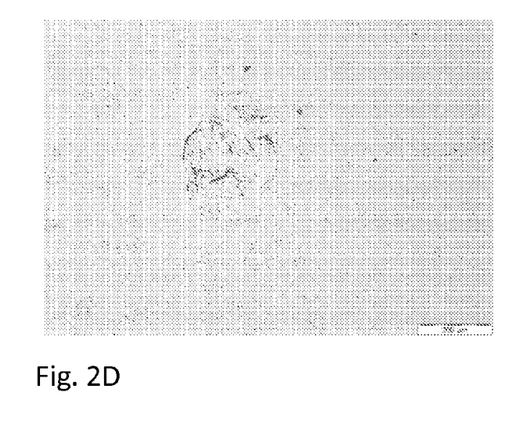
FIG. 2D illustrates the porosity of sample 20/1.8 of Table 2.

As shown in the graph of FIG. 1, the $Mo_2C$ variant in Table 1 exhibits high hardness and a high wear.

In the following, examples of bodies according to different embodiments of the invention will be presented, and the method of making the bodies will be disclosed.

Example I

Four different powder compositions were milled in a ball mill; the compositions are shown in Table 2. PEG was added as a pressing agent. The powder was dried in a Gallenkamp oven (model 135/30027) at 75° C., sieved through a 500 μm mesh sieve and pressed into fargo pieces, 40×25×5 mm, using the Tox press (model STE 510-008-102). These samples were sintered at 1450° C. under 50 bar high isostatic argon pressure in an FCT Anlagenbau GmbH Sinter-HIP furnace.

TABLE 2

| | | $Mo_2C$ | | |
|---|---|---|---|---|
| | | 15 | | 20 |
| Co | PEG3400 | 2 | PEG3400 | 2 |
| 0.9 | WC | 84 | WC | 79 |
| | $Mo_2C$ | 15 | $Mo_2C$ | 20 |
| | Co | 0.9 | Co | 0.9 |
| | $Cr_3C_2$ | 0.1 | $Cr_3C_2$ | 0.1 |
| 1.8 | WC | 83.1 | WC | 78.1 |
| | $Mo_2C$ | 15 | $Mo_2C$ | 20 |
| | Co | 1.8 | Co | 1.8 |
| | $Cr_3C_2$ | 0.1 | $Cr_3C_2$ | 0.1 |

After sintering each body was polished using 200 and 80 μm grit followed by 9, 3 and 1 μm diamond paste. Fracture toughness, $K_{1C}$ and hardness, HV30 were measured. Table 3 shows there was no significant difference in the $K_{1C}$ and HV30 was measured between the samples.

TABLE 3

| Samples | HV30 1 | $K_{1C}$ Shetty |
|---|---|---|
| 15/0.9 | 2200 | 7.1 |
| 15/1.8 | 2196 | 7 |
| 20/0.9 | 2193 | 7 |
| 20/1.8 | 2139 | 6.8 |

FIGS. 2A-2D are photographs illustrating the porosity of each of the four sample variants. SEM images were taken at 20 k magnification with a backscatter electron detector with an electron high tension (EHT) of 10 kV and a working distance (WD) of 6 mm and EDX maps were taken with an EHT of 21 kV and a WD of 13 mm to study the microstructures and the phases present in the compositions made.

TABLE 2

| | | $Mo_2C$ | | |
|---|---|---|---|---|
| | | 15 | | 20 |
| | PEG3400 | 2 | PEG3400 | 2 |
| 0.9 | WC | 84 | WC | 79 |
| | $Mo_2C$ | 15 | $Mo_2C$ | 20 |
| | CoSub | 0.9 | CoSub | 0.9 |
| | $Cr_3C_2$ | 0.1 | $Cr_3C_2$ | 0.1 |
| 1.8 | WC | 83.1 | WC | 78.1 |
| | $Mo_2C$ | 15 | $Mo_2C$ | 20 |
| | CoSub | 1.8 | CoSub | 1.8 |
| | $Cr_3C_2$ | 0.1 | $Cr_3C_2$ | 0.1 |

Figure 3A:
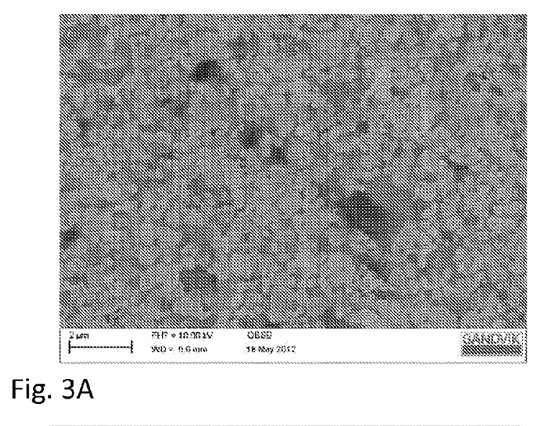
FIGS. 3A-3E are electron microscope images and an EDX map of the microstructures present in sample 15/0.9 of Table 2.
Figure 3B:
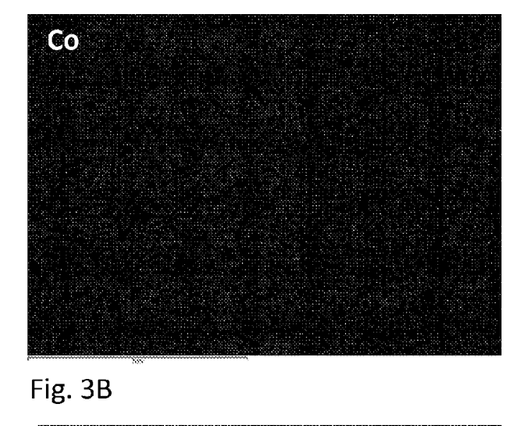
Figure 3C:
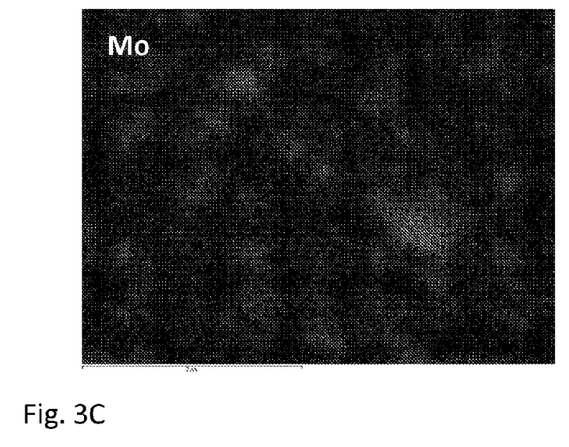
Figure 3D:
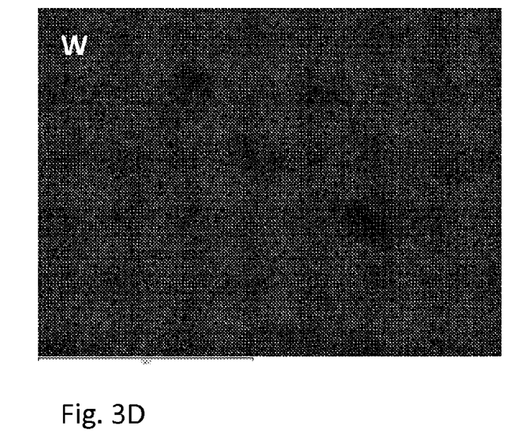
Figure 3E:
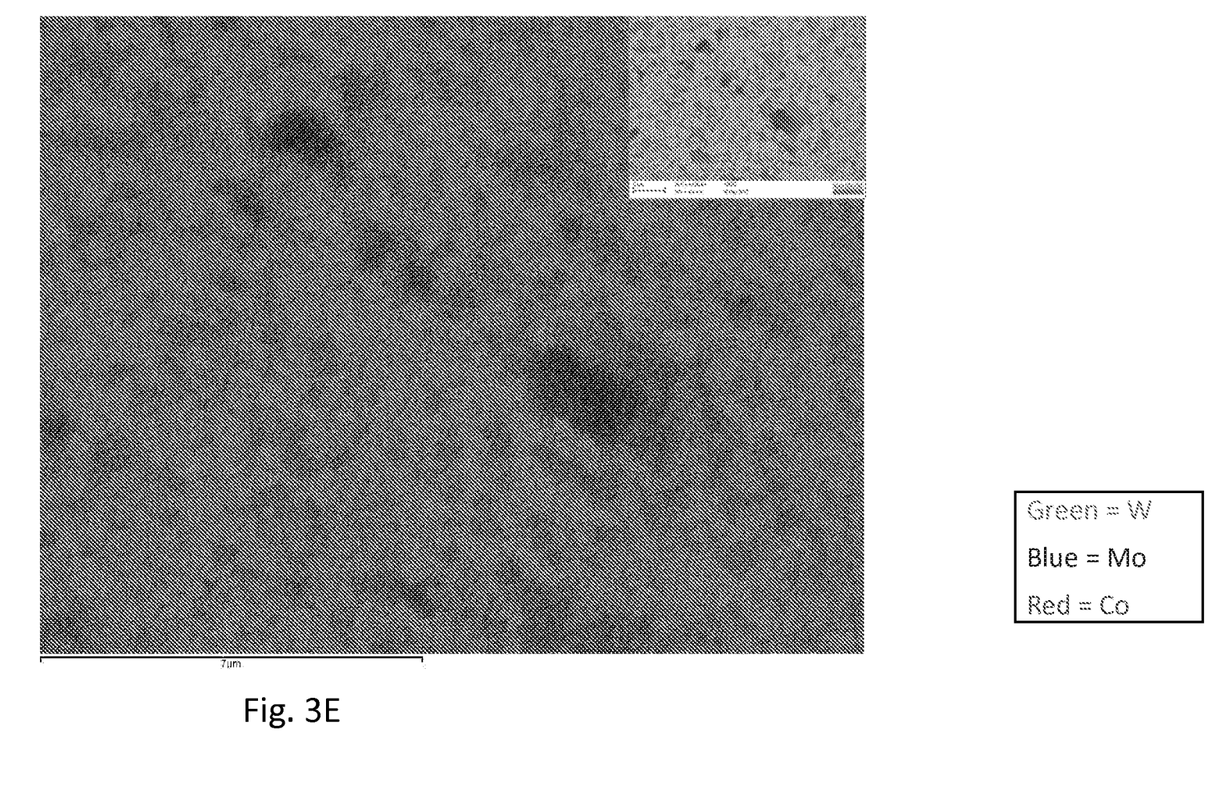
Figure 4A:
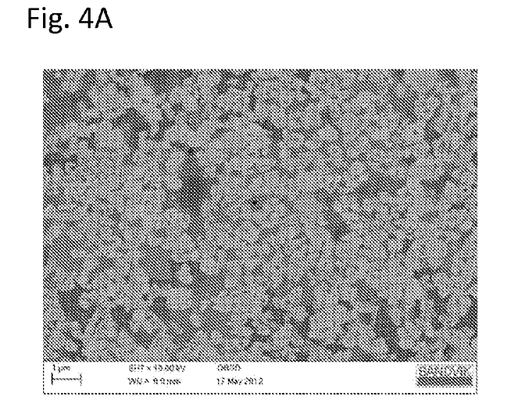
FIGS. 4A-4E are electron microscope images and an EDX map of the microstructures present in sample 20/1.8 of Table 2.
Figure 4B:
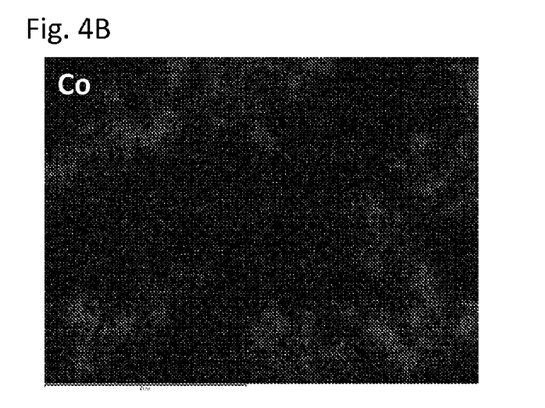
Figure 4C:
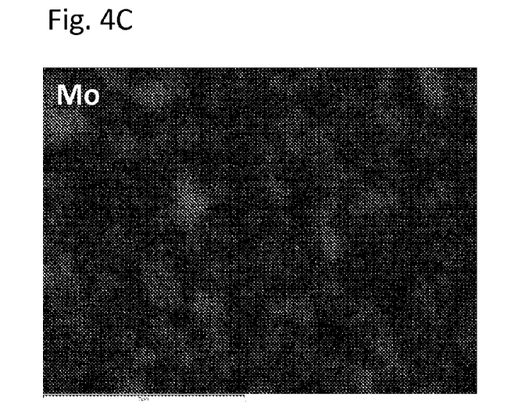
Figure 4D:
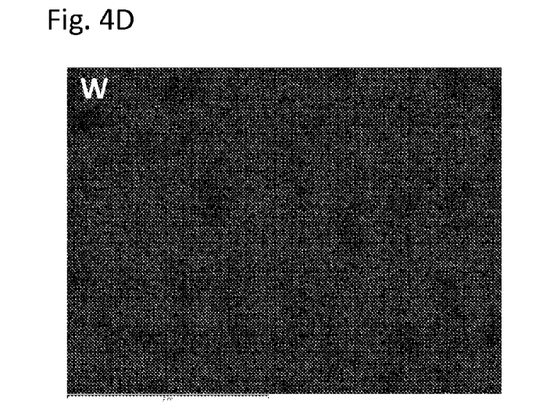
Figure 4E:
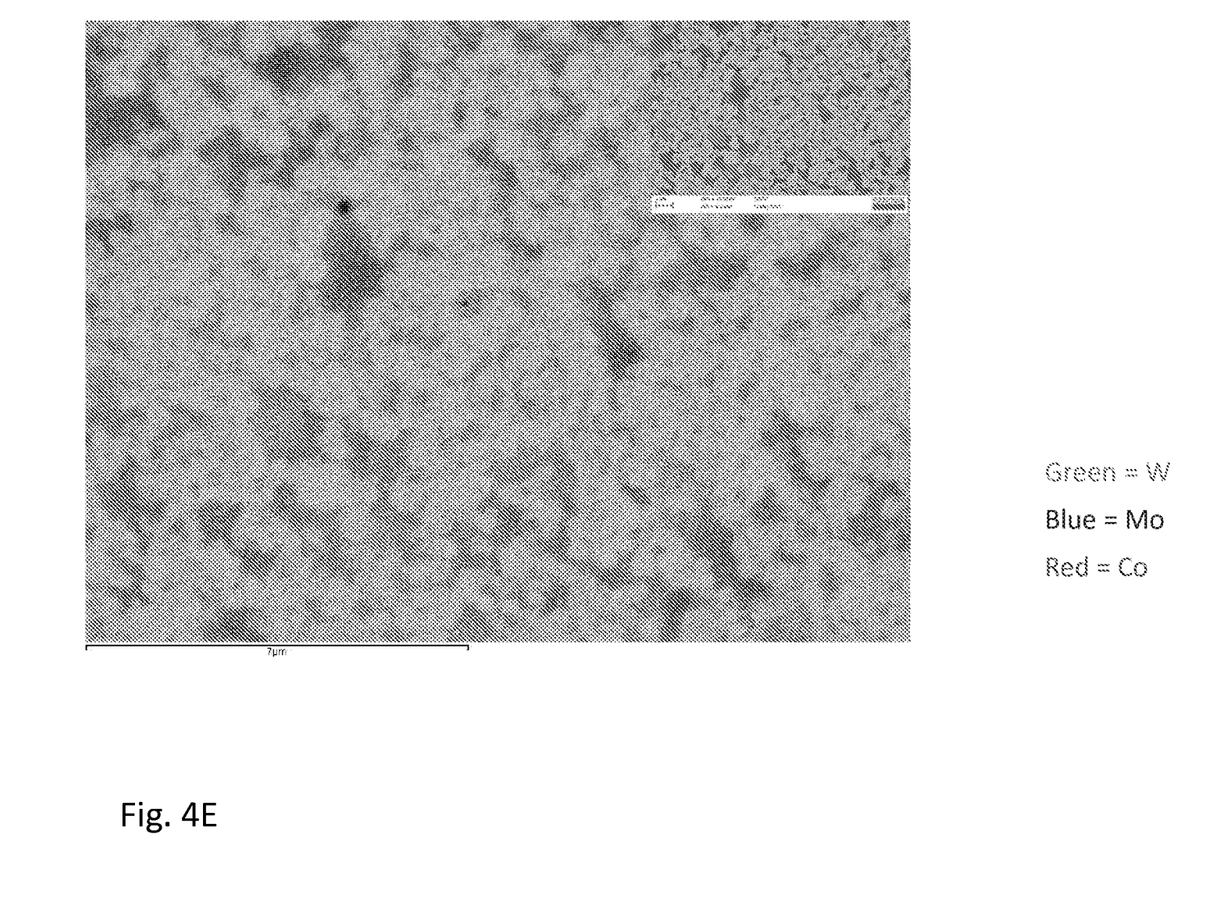

FIGS. 3A-3D are electron microscope images and FIG. 3E is an EDX map for sample 15/0.9 and FIGS. 4A-4D are electron microscope images and FIG. 4E is an EDX map for sample 20/1.8. It can be seen that the WC grains are round and less than 1 μm in grain size, so the grain size is close to the starting WC material size. Thus, it appears that there is no grain growth during the sintering. In all, the roundness of the grains suggests that there is not much grain growth happening through dissolution-reprecipitation, but rather through grain coalescence.

FIGS. 3E and 4E suggest that three phases can be observed.

B611 wear tests were performed on the samples showing the best porosity. B611 wear tests were all performed according to ASTM, 85 (2005). Results can be seen in the graph of FIG. 5.

Figure 5:
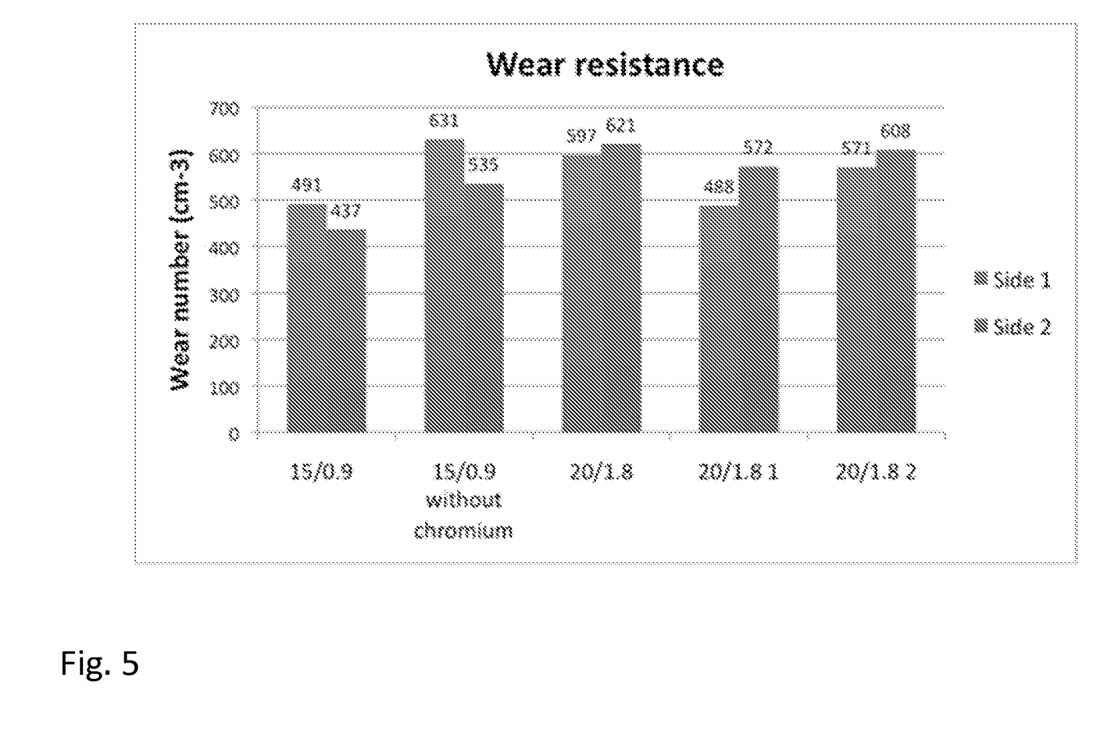
FIG. 5 is a graph of the wear resistance of two binderless variants and samples 15/0.9, 20/0.9. 15/1.8 and 20/1.8.
Figure 6:
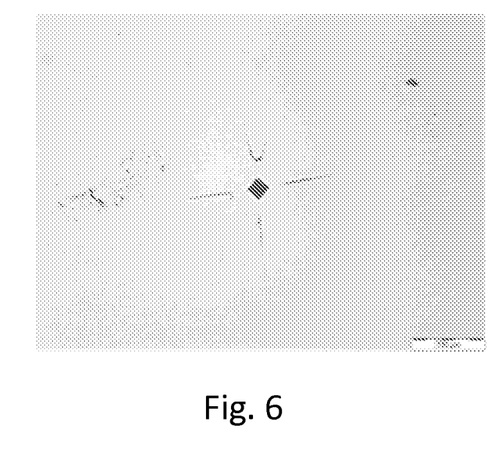
FIG. 6 illustrates the porosity of the 15/0.9 variant with $Cr_3C_2$.

As shown, the s shown, the four samples 15/0.9, 20/0.9, 15/1.8 and 20/1.8 showed better wear results than the previous binderless variants.

Experiments were conducted in the same manner as previously described to determine the effect of removing the inhibitor chromium carbide. Knowing that the grain size is less than 1 μm, another mill was done without adding the inhibitor chromium carbide. Thus, the impact of the chromium carbide on the properties was evaluated.

The recipe of the 15/0.9 variant without chromium carbide is shown in Table 4.

TABLE 4

| WC | 84.1 |
|---|---|
| $Mo_2C$ | 15 |
| CoSub | 0.9 |

TABLE 4-continued

| | |
|---|---|
| $Cr_3C_2$ | 0 |
| PEG | 2 |

$K_{1C}$ and HV30 were measured for the 15/0.9 variant with chromium carbide and the 15/0.9 variant without chromium carbide. Results are shown in Table 5.

TABLE 5

| Grades | HV30 | $K_{1C}$ |
|---|---|---|
| 15/0.9 | 2200 | 7.1 |
| 15/0.9 without $Cr_3C_2$ | 2241 | 7.1 |

No change in the HV30 and $K_{1C}$ was observed so it appears that the presence of chromium carbide does not influence these properties.

Figure 7A:
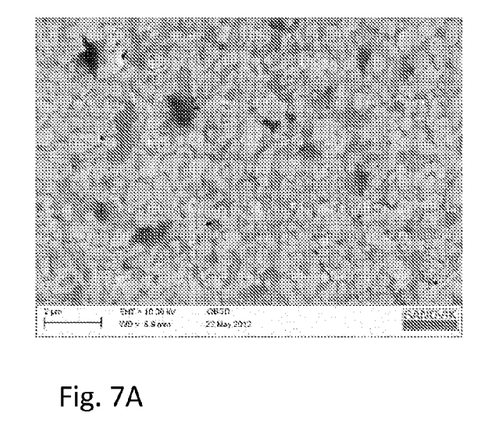
FIGS. 7A-7E are electron microscope images and EDX map of the microstructures present in sample 15/0.9 without $Cr_3C_2$.
Figure 7B:
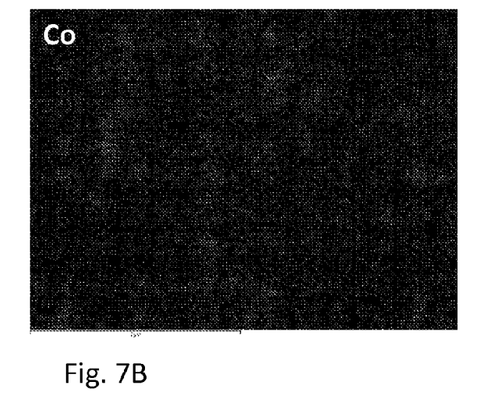
Figure 7C:
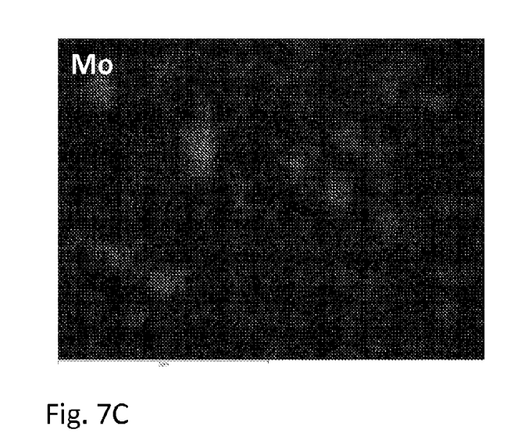
Figure 7D:
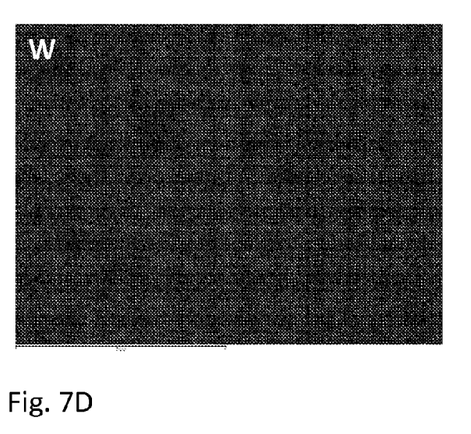
Figure 7E:
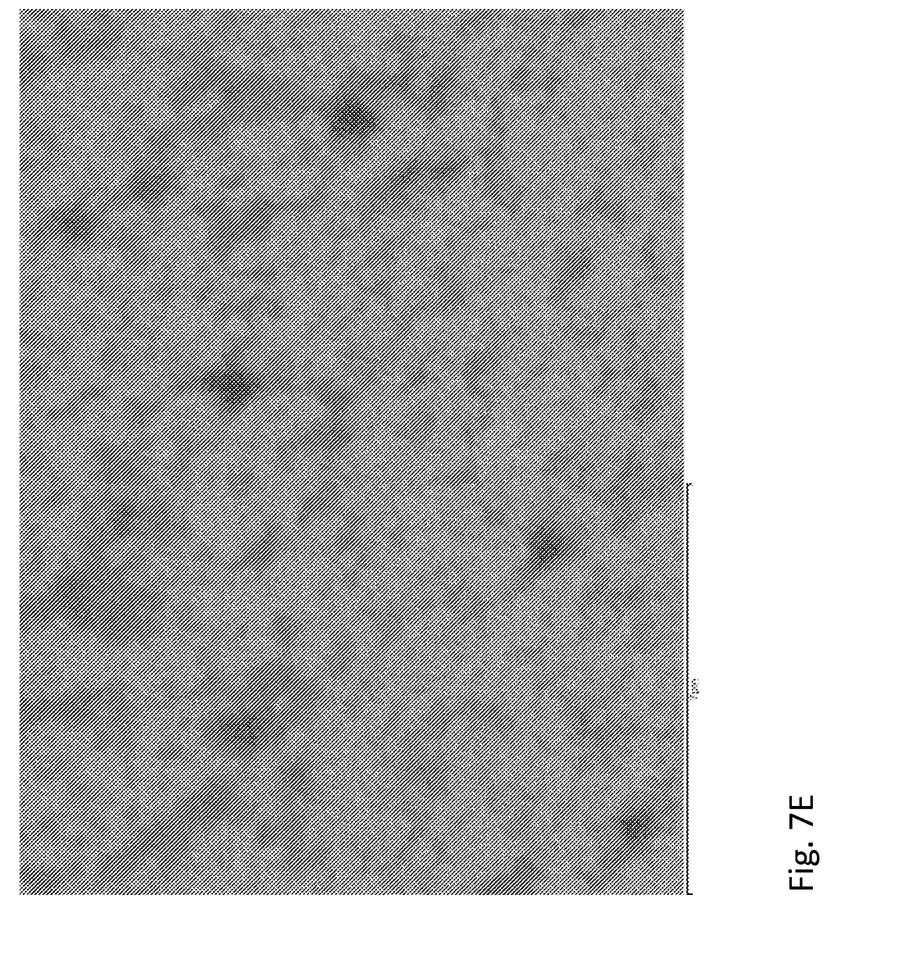

FIGS. 7A-7D are electron microscope images and FIG. 7E is an EDX map for sample 15/0.9 without $Cr_3C_2$. The observations are the same as for the previous variant of 15/0.9; specifically the grains are round and about 1 μm in size. The three phases can also be observed in FIG. 7E. $Cr_3C_2$ is known to improve corrosion resistance but otherwise it would appear to have has no influence on the microstructure and composition, and hence no influence on the hardness and fracture toughness.

Figure 8:
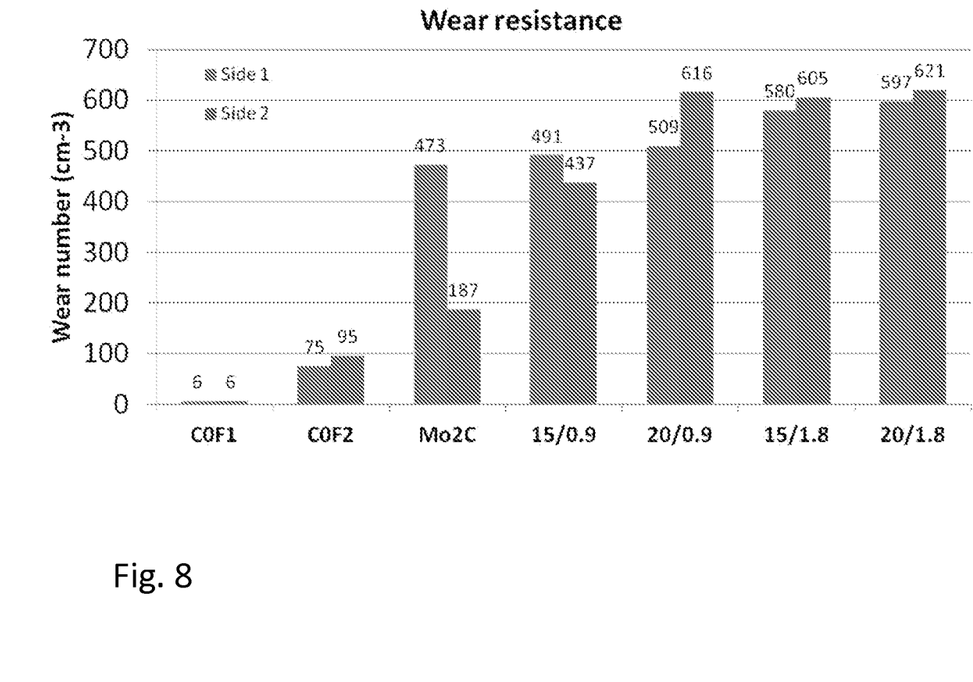
FIG. 8 is a graph of the wear resistance of two variants tested.

The wear test was done on the variant with and without $Cr_3C_2$. Results can be seen in FIG. 8.

In all of the previous experiments, sintering was done at 1450° C. under 50 bar high isostatic argon pressure. A further example, below, shows sintering the 20/1.8 variant in a Carbolite vacuum furnace (model 16/75/450) to 1450° C.

TABLE 6

| Grades | HV30 | $K_{1C}$ Shetty |
|---|---|---|
| 20/1.8 HIP | 2191 | 7.2 |
| 20/1.8 Vacuum | 2190 | 6.9 |

Table 6 shows there was no significant change in hardness or fracture toughness.

The 20/1.8 seemed to be the best variant relating to wear resistance, about 600 cm$^{-3}$, reliability in terms of no porosity on the wear path and homogeneity in Mo and Co distribution.

In a further example, experiments to increase the fracture toughness were conducted. Typically, increasing the $K_{1C}$ avoids crack propagation. Usually the higher the cobalt content the lower the hardness and higher the fracture toughness. Consequently the examples shown in table 7 were milled with a higher cobalt content. A further example is also shown in table 7 whereby the 0.8 μm WC was replaced by the 2.0 μm WC, to see the influence of the grain size on the fracture toughness.

TABLE 7

| 19.87/2.4 | | 19.75/3 | | 20/1.8 2 | |
|---|---|---|---|---|---|
| WC008 | 77.73 | WC008 | 77.25 | WC020 | 78.2 |
| Mo2C | 19.87 | Mo2C | 19.75 | Mo2C | 20 |
| CoSub | 2.4 | CoSub | 3 | CoSub | 1.8 |
| PEG | 2 | PEG | 2 | PEG | 2 |

Figure 9:
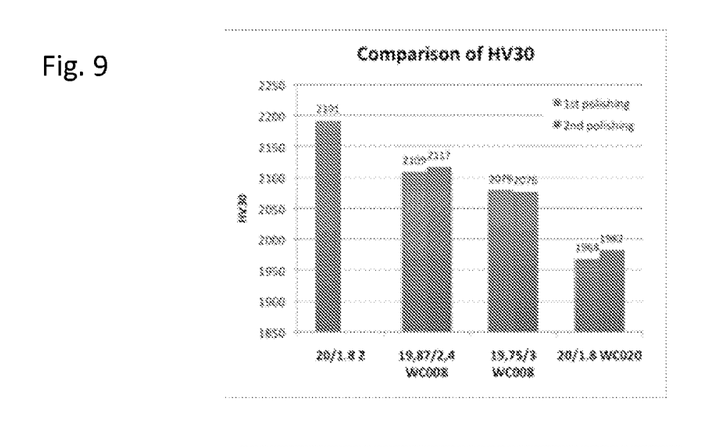
FIG. 9 is a graph of the HV30 between three variants and grade 20/1.8 2.
Figure 10:
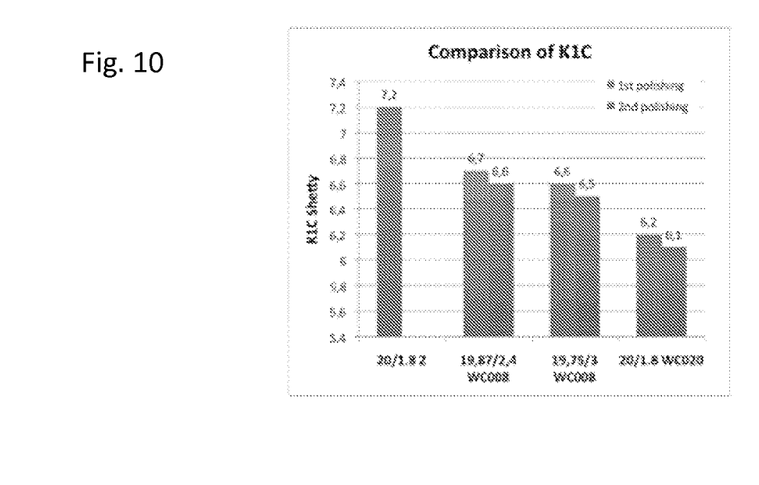
FIG. 10 is a graph of the $K_{1C}$ between three variants and grade 20/1.8 2.

The powder was dried in a Gallenkamp oven (model 135/30027) at 75° C., sieved through a 500 μm mesh sieve and pressed into fargo pieces, 40×25×5 mm, using the Tox press (model STE 510-008-102). These samples were sintered at 1450° C. under 50 bar high isostatic argon pressure in an FCT Anlagenbau GmbH Sinter-HIP furnace. Referring to FIGS. 9 and 10, the HV30 and $K_{1C}$ between the three new variant and the grade 20/1.8 2 were compared. The results were as expected in terms of a reduction in hardness as the cobalt content was increased; however no improvement in fracture toughness was seen.

Figure 11A:
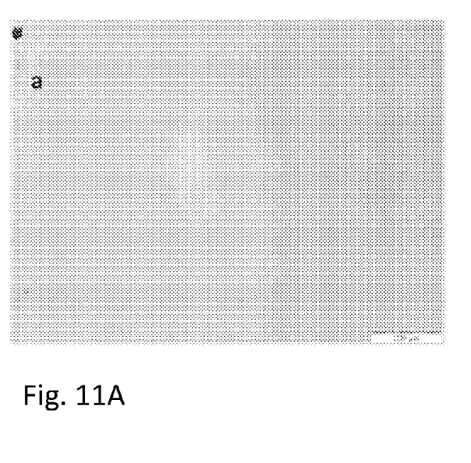
FIG. 11A illustrates the porosity of sample 19.87/2.4.
Figure 11B:
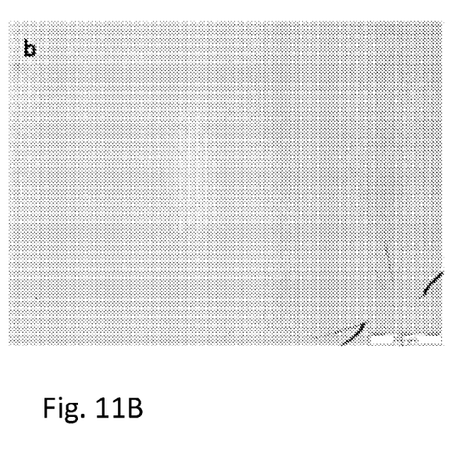
FIG. 11B illustrates the porosity of sample 19.75/3.
Figure 11C:
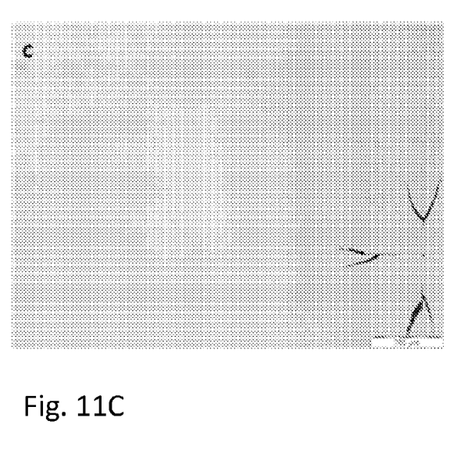
FIG. 11C illustrates the porosity of sample 20/1.8 WCO20.

Porosity of the variants is shown in FIGS. 11A-11C.

Figure 12:
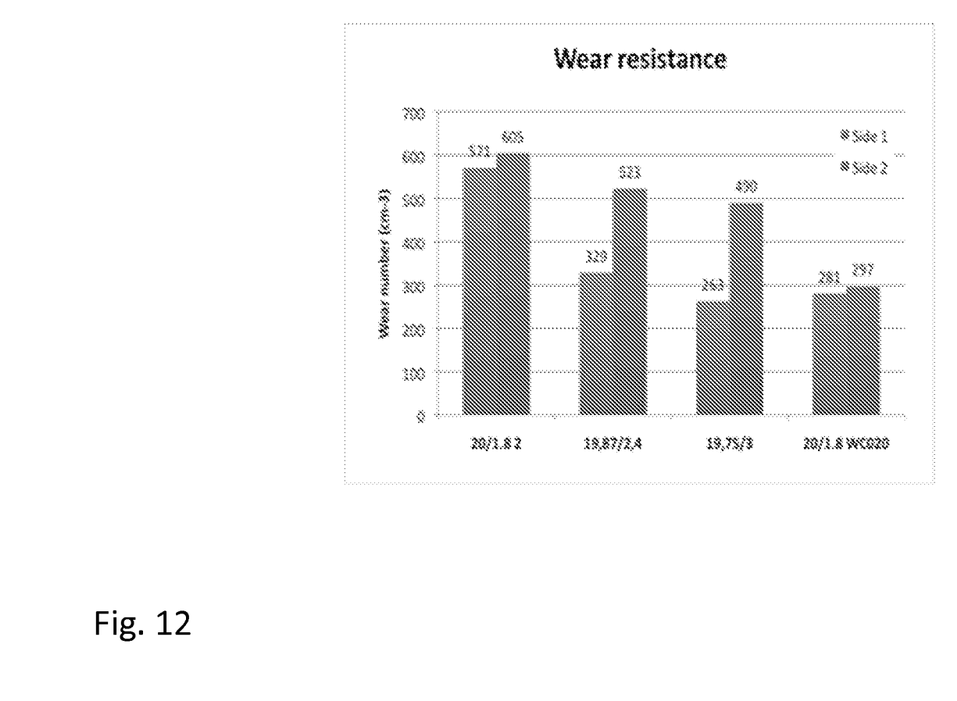
FIG. 12 is a graph of the wear resistance of the variants of Table 8.

Referring to FIG. 12, the wear resistance results are consistent with the hardness results, i.e., the wear resistance decreases with the hardness. In a further example, it has also been shown that the same material properties can be achieved by adding in the molybdenum carbide in its elemental components, Mo+C, as if it had been added in the compound form, $Mo_2C$. A variant of the 15/0.9 composition comprising of 84.1% WC, 0.9% Co, 14.12% Mo, 0.88% C, 2.0% PEG was milled, pressed and then sintered at 1450° C. under 50 bar high isostatic argon pressure. HV30 was measured to be 2185 and $K_{1C}$ was measured to be 7.2, which is comparable to the sample produced from the same composition using the addition of 15% $Mo_2C$ in the compound form.

In a further example the effect of a different binder system was also explored. For some applications, such as pump applications a Nickel (Ni) binder may also be used.

TABLE 8

| Grades | HV30 | $K_{1c}$ Shetty |
|---|---|---|
| 20/1.8 2 Co | 2191 | 7.2 |
| 20/1.8 2 Ni | 2094 | 7.3 |

As shown in a table 8, the hardness is slightly lower with Ni, but still at a high level. There was no change in $K_{1C}$.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A method of making a low binder, wear resistant material comprising the steps of
    providing from about 15 to of about 20% of molybdenum carbide added in either individual molybdenum and carbon elemental or compound form, providing about 0.9 to of about 3% of cobalt, nickel or a combination of cobalt and nickel, providing 0 to of about 0.1% of chromium carbide, and providing the balance of tungsten carbide to form a powder blend;
    milling the powder blend;
    drying the powder blend;
    sieving the powder blend;
    pressing the powder blend; and
    sintering the powder blend at a temperature of from about 1450° C. under a pressure of about 50 bar in an argon atmosphere.

2. The method of claim 1, further comprising the step of providing titanium carbide.

3. The method of claim 1, further comprising the step of providing titanium tungsten carbide.

4. The method of claim 1, further comprising the step of providing about 20% molybdenum and about 1.8% cobalt.

5. The method of claim 1, further comprising the step of providing about 20% molybdenum and about 1.8% nickel.

6. The method of claim 1, further comprising the step of providing about 0.1% chromium carbide.

\* \* \* \* \*